Dec. 19, 1967   E. E. STUBER ET AL   3,358,666
STARTING ENGAGEMENT CONTROLS FOR STARTING ENGINES
Filed Dec. 29, 1965                                    2 Sheets-Sheet 1

INVENTORS
ELWYN E. STUBER
CHARLES SIMMS, JR.

BY *Fryer, Zimrold, Feit + Phillips*
ATTORNEYS

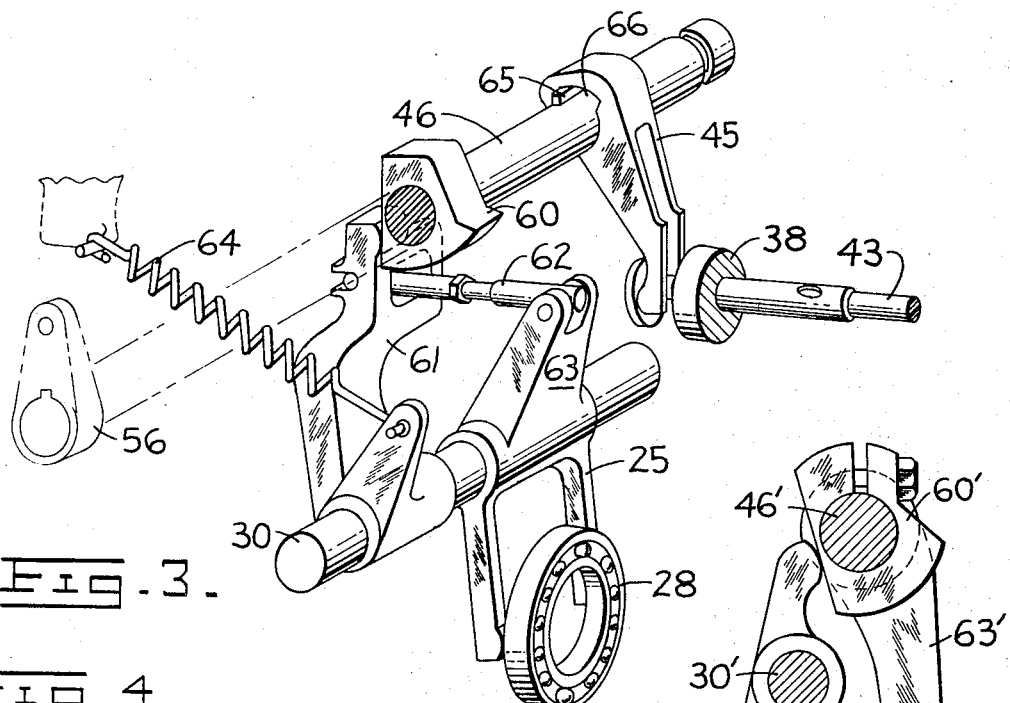
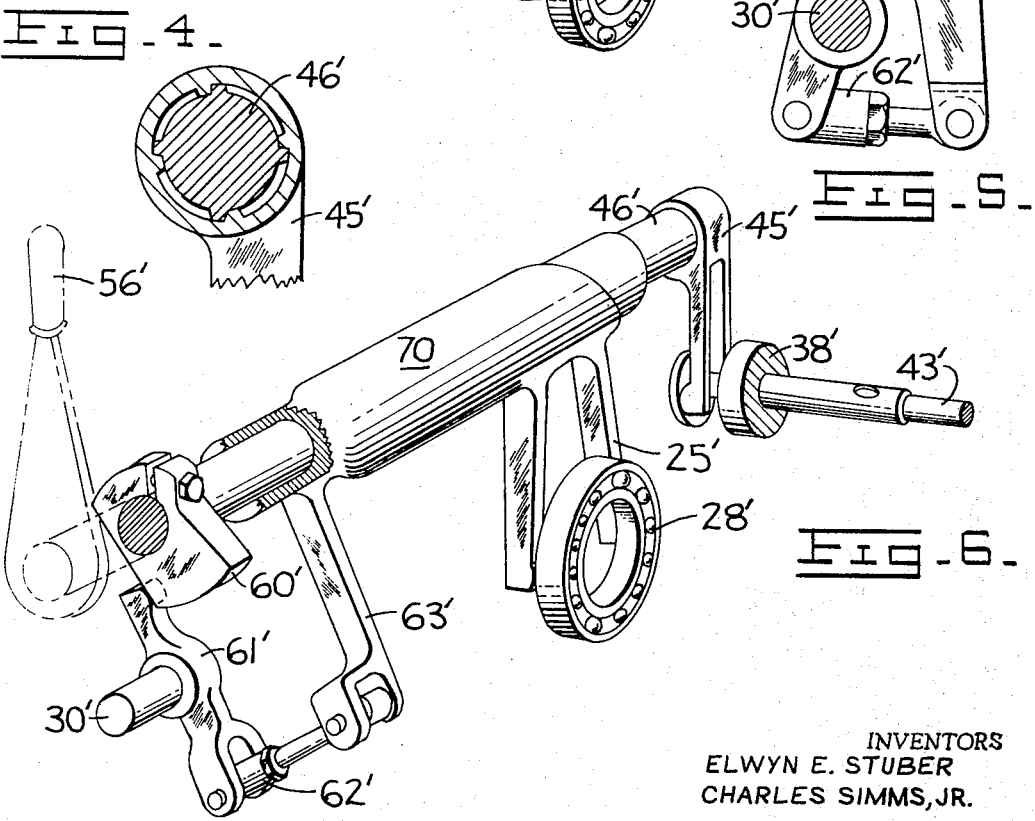

United States Patent Office

3,358,666
Patented Dec. 19, 1967

3,358,666
STARTING ENGAGEMENT CONTROLS FOR STARTING ENGINES
Elwyn E. Stuber, Tremont, and Charles Simms, Jr., East Peoria, Ill., assignors to Caterpillar Tractor Co., Peoria, Ill., a corporation of California
Filed Dec. 29, 1965, Ser. No. 517,242
2 Claims. (Cl. 123—179)

ABSTRACT OF THE DISCLOSURE

Control means for establishing a driving connection between a starting engine and a main engine to be started including a brake and clutch which are both spring engaged and a single lever employed to disengage the clutch, engage the brake and engage the pinion of the starting engine with the ring gear of the main engine.

---

An example of starting engine controls of the kind to which the present invention pertains is disclosed in our assignee's patent to Everett E. Sims et al., No. 2,900,970.

It is an object of the present invention to provide starting controls wherein the brake and clutch between a starting engine and its drive pinion are both spring engaged to avoid the necessity of frequent adjustment.

Another object is to provide starting controls wherein a single lever acts through relatively simple mechanism to first disengage the clutch and engage the brake and thereafter with the same lever movement effect engagement of the pinion with the ring gear of the main engine to be started.

Further and more specific objects of the invention and the manner in which it is carried into practice are made apparent in the following specification wherein reference is made to the accompanying drawings.

In the drawings:

FIG. 3 is a perspective view illustrating parts of the same control linkage;

FIGS. 4 and 5 are fragmentary views illustrating parts of the modified control linkage; and FIG. 6 is a perspective view of the same modified control linkage.

Figure 1:
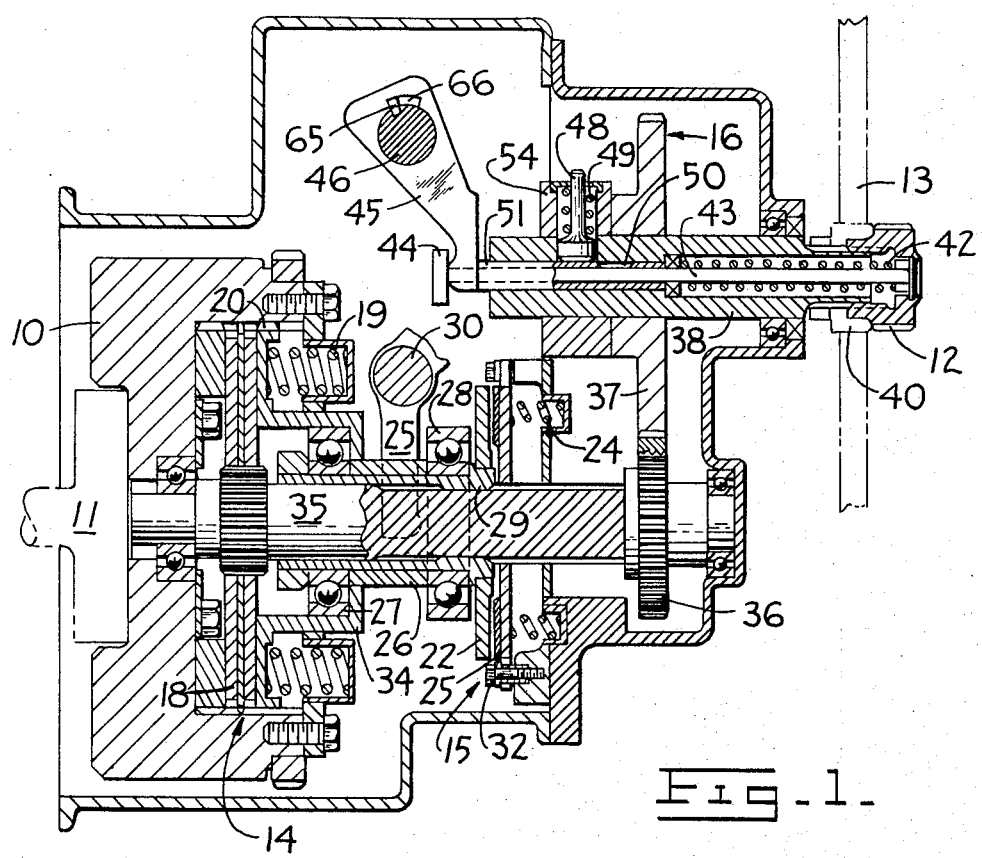
FIG. 1 is a central vertical section through starting engagement controls embodying the present invention.

Referring first to FIG. 1, a flywheel is shown at 10 driven by the crankshaft, a part of which appears at 11, of a starting engine which may be the conventional small internal combustion engine generally used for starting tractor engines. A pinion gear shown at 12 is disposed for movement into meshing engagement with the ring gear of an internal combustion engine to be started, the position of the ring gear being represented in broken lines at 13. The starting control comprises a clutch generally indicated at 14, a brake at 15 and pinion drive gearing 16. The clutch comprises a set of discs 18 normally held in engagement by springs 19 acting against a pressure plate 20. The brake is formed of two disc-like parts 22 and 23, the latter being normally urged toward braking engagement with the former by springs 24. A yoke 25 best shown in FIG. 3 embraces a sleeve 26 between thrust bearings 27 and 28 carried by the sleeve and, upon being rocked about the shaft 30 upon which it is rotated, will act upon clockwise movement to permit engagement of the clutch by the springs 19 and to cause disengagement of the brake by moving the disc 22 away from disc 23. The effect of springs 24 on brake disc 23 is limited by guide screws 32 which act as stops. The screws 32 hold the disc 23 against rotation and the sleeve 26 is splined to the shaft 35 as at 29 so the brake stops rotation of the shaft.

Movement of the yoke 25 in a counterclockwise direction serves conversely to overcome springs 19 and permit disengagement of the clutch discs since the thrust bearing 27 engages a shoulder 34 on a collar which is an extension of the thrust plate 20. This same counterclockwise movement results in engagement of the brake under pressure of springs 24. When the clutch is engaged, it imparts rotation to a shaft 35 which carries a gear 36 meshing with and driving a gear 37 on a spindle 38 to which the pinion 12 is connected as by a spline connection 39. This spline connection permits sliding movement of the pinion from its disengaged position shown in full lines to its position of engagement with the ring gear at 13, this position being represented in broken lines 40. The pinion is urged toward disengagement by a spring 42 contained in a bore of the spindle 38 and may be moved toward its engaged position by a rod 43 extending through the bore with a flange 44 at one end engageable by the bifurcated end of a lever 45 on a control shaft 46. The pinion is retained in its engaged position by a detent 48 urged by a spring 49 into engagement with a notch 50 with a tubular element 51 which surrounds and is fixed to the rod 43 for movement therewith. The detent drops into latching engagement with the notch 50 when the pinion is moved toward its engaged position. The detent is carried in a collar 54 which is pressed onto the spindle 38 for rotation therewith. Consequently disengagement takes place automatically when the main engine has been started and attains a speed which disengages the detent by centrifugal force and permits the spring 42 to urge the pinion to its position of disengagement.

The description so far has been directed to the more or less conventional functions of a starting engagement control mechanism differing principally from that of Patent No. 2,900,970 in that the brake 15 is of the spring engaged type. The present invention resides principally in the control linkages shown in FIGS. 2 to 6, inclusive.

FIG. 3 shows a manual control linkage which includes a lever 56 on the control shaft 46. Suitable linkage (not shown) connects the lever 56 with a manual lever disposed exteriorly of the housing. It is rotation of this shaft 46 in a clockwise direction which imparts rotation to the lever 61, actuating the yoke 25 to disengage the clutch and engage the brake in the manner previously described. This is accomplished by a cam 60 fixed to the shaft 46 (see also FIG. 2) and engageable with an arm 61 which is free to oscillate on the shaft 30. An adjustable link 62 forms a connection between the arm 61 and a lever arm 63 formed integrally with the yoke 25. Consequently the initial clockwise rotation of the shaft 46 causes disengagement of the clutch and engagement of the brake to stop rotation of shaft 35 (see FIG. 1) which imparts driving movement to the pinion. Now with the pinion at rest it can be brought into mesh with the ring gear of the main engine and this is accomplished by further rotation of a shaft 46. As best shown in FIGS. 1 and 3, the initial rotation of the shaft did not affect the lever 45 which draws the pinion into engagement with the ring gear because the lever 45 is connected to the shaft through a key 65 in a lost motion slot 66. After disengagement of the clutch and engagement of the brake, the key engages the end of the slot 66 to impart clockwise rotation to the lever 45 and draw the pinion into its engaged position. When the control lever is not engaged, a weak spring 64 holds fork 25 against the thrust bearing 28 with sufficient force to prevent vibration.

One advantage of the structure just described is that should the pinion teeth abut the teeth on the ring gear, it is a simple matter to momentarily release the manual control to permit momentary clutch engagement and reindexing of the pinion. With the pinion engaged and retained in engaged position of the detent 48, the manual control is reversed causing release of the brake and engagement of the clutch so that the starting engine will motor the main engine.

Figure 2:
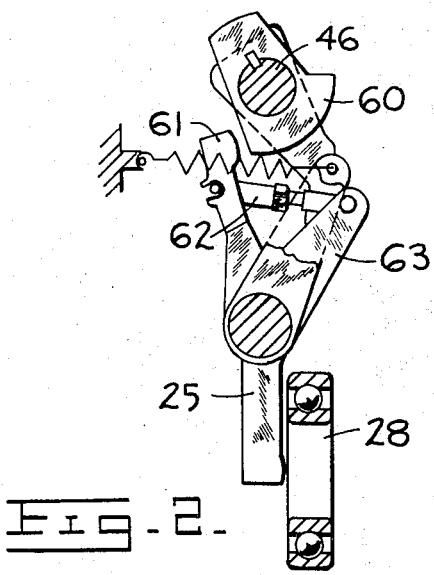
FIG. 2 is a fragmentary sectional view illustrating part of the control linkage.

A modified form of the control mechanism is shown in FIGS. 4, 5 and 6 wherein the same reference characters employed in FIGS. 2 and 3 are primed to designate similar parts. In FIG. 6, a manual control lever 56' rotates a control shaft 46' to which is fixed a cam 60'. This cam rocks a lever 61' on a shaft 30'. The lever 61' is connected by a link 62' with a lever arm 63' on a sleeve 70 which is rotatable on shaft 46' and carries a yoke 25'. This yoke engages a bearing 28' for the purpose already described. The appearance of the cam 60' and associated levers is shown in end elevation in FIG. 5. The rod 43' is moved to affect engagement of the pinion by the lever 45' which is connected to the shaft 46' by a lost motion connection in the form of loosely fitting splines as clearly illustrated in FIG. 4.

Through the use of the cam mechanism and the lost motion mechanism, it is possible to move the clutch and brake actuating member in one direction and the pinion engaging member in the opposite direction in properly timed sequence and also in response to motion in only one direction of a manually actuated lever. Since the clutch and brake are both spring loaded, they are in effect self adjusting and require very little service.

We claim:
1. Starting engagement controls between a starting engine for driving a pinion and a main engine having a ring gear for engagement by the pinion comprising a clutch and a brake controlling transmission of power to the pinion, means to engage and disengage the pinion, a rockable control shaft, a cam on said shaft operable upon rocking movement in one direction to cause clutch disengagement and brake engagement, and a lever on said shaft operable upon further rocking movement in the same direction to cause engagement of the pinion with the ring gear, said clutch and brake being urged toward their engaged positions by springs.

2. The combination of claim 1 with a lever interposed between the cam and the clutch and brake actuating mechanism to impart movement in one direction while the lever for engaging the pinion moves in the opposite direction.

References Cited
UNITED STATES PATENTS

| | | | |
|---|---|---|---|
| 1,784,354 | 12/1930 | Haussmann | 74—355 |
| 2,900,970 | 8/1959 | Sims et al. | 192—17 X |

FRED C. MATTERN, Jr., *Primary Examiner.*

F. D. SHOEMAKER, *Assistant Examiner.*